Figure 1:
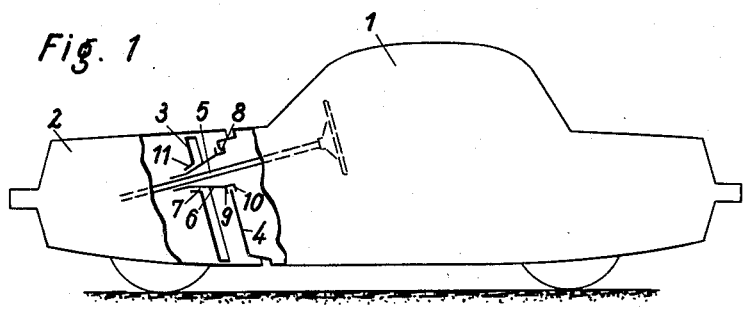

INVENTOR
KARL WILFERT

BY *Dicke & Craig*

ATTORNEY

United States Patent Office 2,797,955
Patented July 2, 1957

2,797,955

SOCKET FOR SEALING STEERING COLUMN AND CONTROLS IN SECTIONAL VEHICLE BODY

Karl Wilfert, Stuttgart-Degerloch, Germany, assignor to Daimler-Benz Aktiengesellschaft, Stuttgart-Untertürkheim, Germany Application November 17, 1954, Serial No. 469,507

Claims priority, application Germany November 18, 1953

5 Claims. (Cl. 296—28)

The present invention relates to a lead-in socket for cables, rods, pipes, and similar conduits, particularly for connecting the individual sections or parts of automobiles and similar vehicles which are built in the form of separate, substantially self-contained cells or compartments which are subsequently assembled and secured together. More particularly, the invention concerns improvements in resilient lead-in sockets as described in my copending application Serial No. 454,553, and especially the manner and means for installing and mounting such sockets.

It is the primary object of the invention to provide a new manner and new means for mounting resilient lead-in sockets in the openings provided for them in the partitions separating the respective compartments or cells, which means facilitate the installation of such sockets considerably and, at the same time, contribute materially in sealing these openings tightly against the outside.

A principal feature of the invention consists in designing the lead-in sockets in the shape of a funnel-like resilient sleeve, and in providing suitable openings of different sizes in the adjacent walls of the respective compartments or cells. Such design permits the resilient sockets to be easily inserted from the inside of one cell through a larger opening therein, and then from the outside of the wall of the adjacent cell through a smaller opening therein. Such design also permits an easy removal of the socket in the opposite direction, if required.

Another feature of the invention which permits an easier insertion of the lead-in sockets resides in designing the sealing flanges of such sockets which close the openings in the cell walls on both sides thereof, preferably in such a manner that the flange of each pair which has to be passed through the opening in each respective cell wall projects less toward the outside than those flanges which press upon the other side, i. e., the side from which they are to be inserted.

More specifically, it is a preferred feature of the invention to provide that flange of each pair which lies at the side of the funnel-like socket having the larger cross section or diameter, in the shape of a suction cup and of gradually reducing thickness toward its outer periphery which presses against the cell wall, and to provide the other flange of each pair which lies at the side having the smaller cross section or diameter, in the shape of a narrower web which, when pushed through the respective opening in the cell wall, snaps behind such wall and locks the suction cup on the other side of the wall in a tightly sealing engagement therewith.

Further objects, features, and advantages of the invention will be apparent from the following detailed description thereof and the appended drawings, in which—

Figure 2:
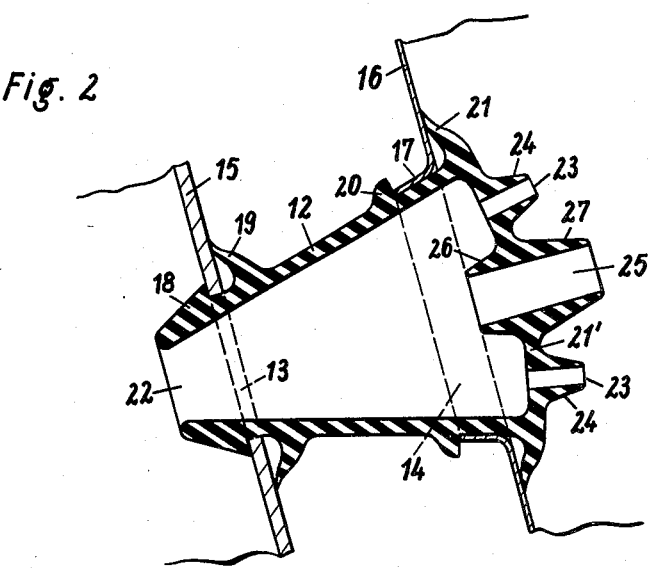

Fig. 1 diagrammatically illustrates an automobile built according to the cell or compartment system, in which the space intermediate the two closed cells is bridged by a lead-in socket according to the invention; while Fig. 2 shows an enlarged longitudinal section through a modification of the lead-in socket according to the invention.

Referring to the drawings Fig. 1 diagrammatically shows an automobile built according to the cell or compartment system comprising a main cell 1 containing the passenger compartment, and a forward cell 2. The adjacent cell walls 3 and 4 have mounted therein a socket 6 which passes through these walls and is designed as a lead-in for the steering column 5 of the automobile. The socket 6 passes through these walls and is designed as a lead-in for the steering column 5 of the automobile. The socket 6 is made of resilient material, such as rubber or plastic, and, preferably of substantially funnel-like shape. The walls 3 and 4 of the adjacent cells are provided with coaxial openings 7 and 8, respectively, substantially in accordance with the size and shape of the socket 6 which may thus be very easily inserted into the openings 7 and 8 from the inside of the main cell 1, so as then to cling tightly to the wall portions adjacent the openings 7 and 8. At the opening 8 of the main cell 1 the socket 6 is provided with outwardly projecting flanges 9 and 10 which tightly surround the wall portions adjacent the opening 8 on both sides and prevent the socket 6 from sliding or slipping relative thereto. A flange or collar 11 of the cell wall 3 of smaller size in accordance with the funnel-like shape of socket 6 tightly adheres to the latter and seals the opening 7 formed between flange 11 and socket 6 against the space intermediate the two cells 3 and 4.

In the second embodiment of the invention shown in Fig. 2 the funnel-shaped socket 12 is mounted in suitable openings 13 and 14 in the end walls 15 and 16 of the adjacent cells or compartments. These openings 13 and 14 are likewise made of a size so as to correspond substantially to the respective diameter of the socket 12 which depends upon the taper of the socket 12 and the distance between the walls 15 and 16 to be bridged by the socket. In order to increase the area of contact between the thin wall portions adjacent the larger opening 14 and the body of the socket 12, these wall portions are bent outwardly, i. e., toward the other cell 15, so as to form a relatively wide rim 17 tapered slightly inwardly in accordance with the taper of the socket 12. The socket 12 has two flanges 18 and 19 adapted to engage the wall portions adjacent the opening 13 in the cell wall 15 at both sides thereof, and two flanges 20 and 21 adapted to engage the wall portions adjacent the opening 14 in the cell wall 16. In order to facilitate the insertion of the socket 12 into the openings 13 and 14 from the inside of the cell wall 16, the flanges 18 and 20 are preferably made so as to project outwardly considerably less than the flanges 19 and 21. As clearly shown in Fig. 2, the flanges 18 and 20 merely form narrow thickened portions or reinforcing webs, whereas the flanges 19 and 21 preferably are made rather wide and of a cross-sectional shape similar to suction cups with their outer rim terminating into a thin edge and inclined toward the walls 15 and 16, respectively, so as to leave intermediate hollow spaces. Preferably, the flange 18 extends as a reinforcement to the end of the socket 12 which also prevents this end from collapsing during the insertion or from being deformed by any conduits or the like passing through the central opening 22 of the socket 12. Thus, when the socket 12 is fully inserted in the openings 13 and 14, the flanges 18 and 20 will snap-in behind the edges surrounding the openings and lock the socket 12 securely into place, with the flanges 19 and 21 pressing tightly but resiliently against the other side of the walls 15 and 16, sealing the socket thereto. The suction-cup-like shape of the flanges 19 and 21 with their outer ends being very thin permits a certain movement of the walls 15 and 16 relative to each other without danger that the sealing action of the socket on the walls will thereby be affected.

For separately and securely guiding and sealing electrical or other conduits passing through the socket 12 from one cell to the other, the end wall 21' connecting the side portions of the flange 21 is provided with suitable openings 23 and 25, the wall portions 24 and 27, respectively, of which preferably project toward the inside of cell 1 and taper individually toward such inside end. If desired, the larger central opening 25 obviously may also serve as a lead-in socket for the steering rod 5.

While the foregoing description sets forth in detail what I regard as the preferred embodiments of my invention, it is to be understood that numerous changes may be made therein without departing from the spirit and scope of the invention as defined in the appended claims.

Having thus described my invention, what I claim as new is:

1. In combination with a motor vehicle having at least two separate, adjacent compartments and a space intermediate said compartments, said compartments having coaxial openings in the walls facing each other, one of said openings having a larger diameter than the other, a resilient lead-in socket of substantially conical shape mounted within said openings, bridging said space, and connecting said walls, said socket having at least one opening therein for passing at least one conduit therethrough from one of said compartments to the other, and a pair of flanges on said socket adjacent each wall for attaching as wall as sealing said socket to said walls.

2. In combination with a motor vehicle having at least two separate, adjacent compartments and a space intermediate said compartments, said compartments having coaxial openings in the walls facing each other, one of said openings having a larger diameter than the other, a resilient lead-in socket of substantially conical shape mounted within said openings, bridging said space, and connecting said walls, said socket having at least one opening therein for passing at least one conduit therethrough from one of said compartments to the other, and a pair of resilient flanges near each end of said socket, projecting outwardly therefrom, and adhering to opposite sides of each of said facing walls, the flange of each pair located toward the end of said conical socket with the smaller diameter being of smaller outer diameter than the other flange, the flanges of each pair cooperating with said walls for attaching as well as sealing said socket to said walls.

3. In combination with a motor vehicle having at least two separate, adjacent compartments and a space intermediate said compartments, said compartments having coaxial openings in the walls facing each other, one of said openings having a larger diameter than the other, a resilient lead-in socket of substantially conical shape mounted within said openings, bridging said space, and connecting said walls, said socket having at least one opening therein for passing at least one conduit therethrough from one of said compartments to the other, and a pair of resilient flanges near each end of said socket, projecting outwardly therefrom, and adhering to opposite sides of each of said facing walls, the flange of each pair located toward the end of said conical socket with the smaller diameter being of smaller outer diameter than the other flange, and, when said socket is being inserted into said openings, snapping behind the respective walls, the other flange of each pair having in cross section substantially the shape of a suction cup with the cup side adhering to the respective wall of said compartments, the flanges of each pair cooperating with said walls sealing said socket to said walls.

4. In combination with a motor vehicle having at least two separate, adjacent compartments and a space intermediate said compartments, said compartments having coaxial openings in the walls facing each other, one of said openings having a larger diameter than the other, a resilient lead-in socket of substantially conical shape mounted within said openings, bridging said space, and connecting said walls, said socket being hollow and having at least one end wall, at least one projection on at least one side of said end wall and tapering toward its free outer end, and a lead-in opening extending through said projection and end wall, the walls of said opening adapted closely to surround a conduit passing therethrough and through said hollow socket from one of said compartments to the other, and means on said socket for attaching as well as sealing said socket to said walls.

5. In combination with a motor vehicle having at least two separate, adjacent compartments and a space intermediate said compartments, said compartments having coaxial openings in the walls facing each other, one of said openings having a larger diameter than the other, a resilient lead-in socket of substantially conical shape mounted within said openings, bridging said space, and connecting said walls, at least one of said openings having a flanged wall, said wall being tapered in accordance with the taper of said conical socket, said socket having at least one aperture therein for passing at least one conduit therethrough from one of said compartments to the other, and a pair of resilient flanges near each end of said socket, projecting outwardly therefrom, and adhering to opposite sides sides of each of said facing walls, the flange of each pair located toward the end of said conical socket with the smaller diameter being of smaller outer diameter than the other flange, the flanges of each pair cooperating with the wall portions surrounding said openings for attaching as well as sealing said socket to said wall portions; said smaller flanges adapted to snap behind the respective wall when said socket is fully inserted in said openings to lock each pair of flanges in a fixed position to the respective wall, the two pairs of flanges, however, permitting resilient motion relative to each other.

References Cited in the file of this patent

UNITED STATES PATENTS 2,678,231 Barenyi _____ May 11, 1954

FOREIGN PATENTS 506,845 Great Britain _____ June 6, 1939